Feb. 11, 1958     H. J. HANSEN     2,823,048
VALVE UNIT
Filed April 17, 1957
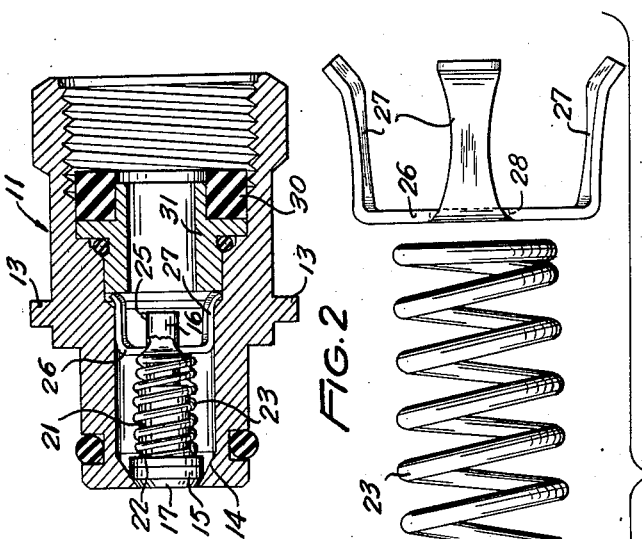
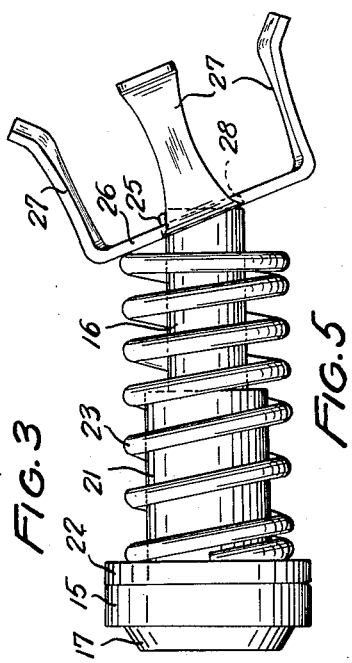
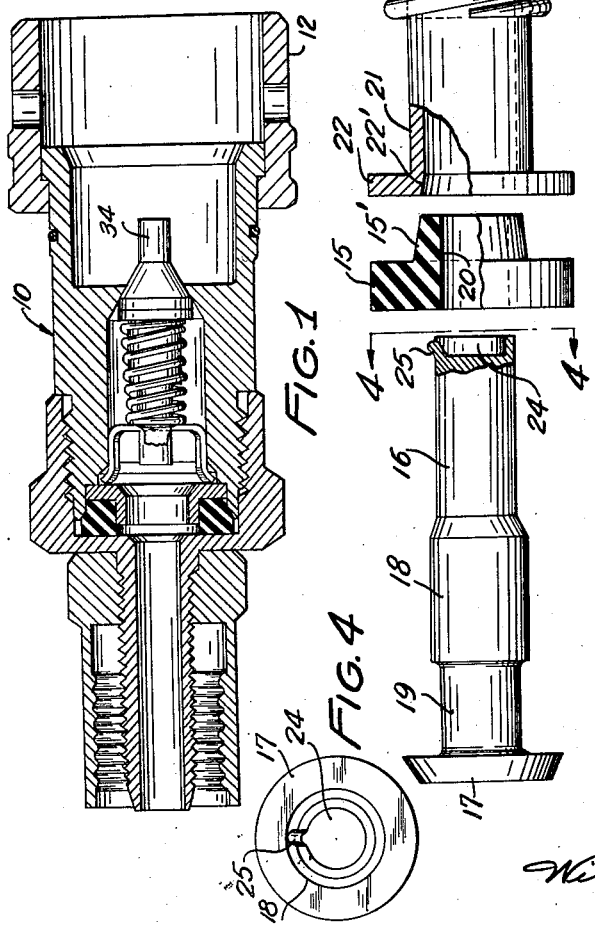
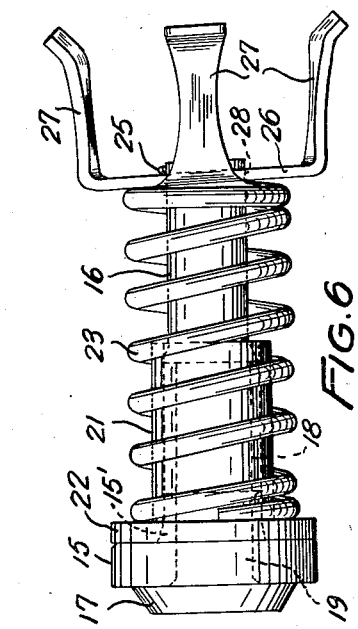
INVENTOR.
HOWARD J. HANSEN
BY Hudson, Boughton,
Williams, David & Hoffmann
ATTORNEYS

2,823,048

VALVE UNIT

Howard J. Hansen, Bay Village, Ohio, assignor to The Hansen Manufacturing Company, Cleveland, Ohio, a corporation of Ohio Application April 17, 1957, Serial No. 653,389

9 Claims. (Cl. 284—18)

This invention relates to a valve unit. As herein disclosed, the unit is designed for use in a fluid coupling having a valve that is biased toward closed position but is opened automatically when the coupling is made.

One of the objects of the invention is the provision of a removable valve unit having separable parts which may be readily disassembled for cleaning, including a gasket that may be replaced with a new one at minimum expense whenever the unit is removed for cleaning and sterilization.

In the handling of soft drink beverages and other liquids intended for human consumption, the equipment used for preparing the beverages and bottling them must be maintained in perfectly sanitary condition. This calls for cleaning and sterilizing of the flexible conductors through which the liquid must pass. As a rule, each such conductor will include at least one coupling, and the couplings generally are valved couplings. The metal parts of such couplings are made of some metal, stainless steel for example, which is not affected by the liquid to be handled, and in order that the valve may be effectively sealed, it must include a rubber gasket. The chemicals in some drinks attack the gasket and render it soft and swollen, which cuts down and fouls up the operation of the machine, as well as shedding particles of the gaskets into the liquid. Cleaning and sterilization of the machine parts are normally practiced at the end of each day's run. Where the gasket is a permanent part of each valve unit, as it has been heretofore, it is necessary in order to replace the gasket to discard the whole unit and insert a new one in its place. In accordance with the present invention that is not necessary. The unit may be disassembled, the old gasket may be removed, the metal parts cleaned and sterilized and the unit reassembled using a new gasket.

In the drawing,

Fig. 1 is a central longitudinal section of the female member of the coupling, and Fig. 2 is a central longitudinal section of the male member.

Fig. 3 is a disassembled view of the valve unit.

Fig. 4 is a cross-sectional detail view taken substantially on the line 4—4 of Fig. 3.

Fig. 5 is a detail view of the valve unit in the process of being assembled, and Fig. 6 is a similar view of the completely assembled unit.

The coupling illustrated herein is similar in general respects to that of my co-pending application No. 478,834, filed December 30, 1954. It employs a female member 10 and a male member 11. The female member has a slidable and rotatable sleeve 12 with a pair of bayonet slots which receive projecting pins 13 on the male member when the two members of the coupling are joined. Each of the members 10 and 11 carries a valve unit. The two units are similar and function to seal the respective members in the same way when the coupling is not assembled. Accordingly the unit for the male member only will be described in detail.

The member 11 has a tapered valve seat 14 that is sealed by the gasket 15 when the coupling is disconnected. The unit itself comprises a stem 16 with a head 17 and a large diameter portion 18. Between the head 17 and the large diameter portion 18 there is an annular groove 19 which receives the gasket 15 when the unit is assembled. Preferably the hole 20 in the gasket is slightly smaller in diameter than the outer diameter of the stem 16 and the diameter of the bottom of the groove 19, but the gasket is highly elastic, being either natural or synthetic rubber, and may be readily drawn by the operator over the stem 16 and the large diameter portion 18 into position in the groove 19. Thus, there is a tight fit of the gasket in its groove. In order to effectively prevent leakage of liquid when the pressure in the conductor and coupling is relatively high, I have devised a novel form of gasket which includes a laterally extending collar 15' which is tapered axially away from the main portion of the gasket, the complete gasket being accommodated in the groove 19.

When the gasket is in place behind the head 17 of the unit, the operator then slides a metal sleeve 21 over the stem 16 and the enlargement 18, the bore of the sleeve being such as to provide the necessary clearance between the sleeve and the enlargement without appreciable friction. At the forward end of sleeve 21, there is a flange 22 of approximately the same diameter as the gasket. The bore of the sleeve 21 at its forward end has a conical taper 22', the angle of which is approximately the same as that of the collar 15' of the gasket. A helical spring 23 of a diameter to rather snugly receive the sleeve 21 is next put in place. The length of the uncompressed spring 23 is somewhat greater than the length of the sleeve 21 plus the rear small diameter portion 16 of the stem.

The tapering of the collar 15' and the similar tapering 22' of the forward end of the bore in sleeve 21 are important. When the sleeve 21 is forced forward, until the flange 22 firmly contacts the radial surface of the gasket 15, the collar 15' is crowded inwardly all around its periphery, which causes its inner surface to tightly and evenly grip the grooved wall 19 of the stem, thereby effecting a mechanical seal which prevents leakage even under high pressure conditions.

The force exerted by the spring tending to compress the gasket collar 15' against the stem 16 varies with the degree of the taper of the parts 15', 22'. This taper angle should be no greater than 45°. As shown in Fig. 3 it is considerably less than 45°, which results in the component of the force of the spring toward the stem 16 being greater than the component parallel with the stem.

The rear extremity of the stem 16 is provided with a cavity 24, Fig. 3, and at one point the wall surrounding this cavity is deflected outwardly by any suitable means to form a small projection 25 which constitutes an important element of the invention. A backstop 26, which in the present instance is a flat plate with three rearwardly extending legs 27, has a central hole 28 of a diameter which is only slightly greater than the diameter of the stem 16. To assemble this backstop onto the unit, the operator retracts the spring slightly with the fingers of one hand while with the other hand he tilts the backstop to the position illustrated in Fig. 5 which enables him to slip it over the projection 25. Then he releases the spring. The released spring, in expanding, presses against the backstop 26 radially outward from projection 25 and tilts the backstop about the projection until the parts come into the position illustrated in Fig. 6, when the unit is fully assembled and may be stored until required for use. The spring, being compressed, will hold the backstop from accidental displacement, and will compress the collar 15'.

Assuming that the coupling member 11 is to be disassembled and the parts thereof cleaned and sterilized and a new gasket inserted, the operator removes a washer 30 and a flanged casting 31. The spring 23 then expands until the backstop is forced into the position of Fig. 6. He may then tilt the backstop into the position of Fig. 5 and slip it over projection 25 and off the unit. The spring 23 and the flanged sleeve 21 are then slid off, after which the gasket 15 is pried out of the groove 19 and pulled over the enlargement 18 and off the stem. Reversing the procedure, a new gasket is mounted in groove 19 and the metal parts of the unit reassembled. The cost of the new gasket is insignificant, and hence, there is no reason why a new one should not be put into use each time the apparatus is cleaned.

The coupling illustrated in Figs. 1 and 2 is a two way cutoff coupling. The spring 23 of each valve unit forces its flange 22 and its gasket 15, 15' into sealing connection with the valve seats in the two coupling members. When the two members of the coupling are connected together, a forwardly projecting shank 34 on the valve unit in the member 10 contacts the head 17 of the unit in member 11, which unseats both valves, so that flow of liquid may take place through the conductor line in which the coupling is employed.

Having thus described my invention, I claim:

1. A valve unit comprising a stem having a head, a removable gasket surrounding said stem behind said head, a removable backstop having a central opening slidably receiving said stem, a helical spring surrounding the stem, pressing said gasket forward against said head, and at its other end bearing against said backstop, and a projection on said stem behind said backstop, the backstop being disposed between said projection and said spring and being held at right angles to said stem by the rear end of said spring.

2. A valve unit according to claim 1, embodying a hard sleeve surrounding the stem behind said gasket, against which the forward end of the spring bears.

3. A valve unit according to claim 1, including a sleeve surrounding the stem with a flange at its forward end disposed between said gasket and said spring.

4. A valve unit according to claim 3, wherein the outer diameter of said sleeve is appreciably greater than the diameter of said stem, whereby the spring bears on the backstop radially outwardly from said projection.

5. In a fluid coupling, a body having a valve seat at its forward end, a valve unit comprising a headed stem, a removable gasket surrounding said stem to the rear of its head, a sleeve surrounding said stem having a forward flange bearing against said gasket, a removable backstop with a flat forward face having a central opening slidably receiving said stem, a helical spring surrounding the sleeve pressing against said flange and against said backstop radially outward of the opening therein, a projection on the rear end of said stem about which said backstop may be tilted for purposes of assembly and disassembly, and means in said body forming an abutment for said backstop.

6. A valve unit comprising a stem having a head, a removable gasket surrounding said stem behind said head, a removable sleeve with a forward flange surrounding the stem behind said gasket, comprising a rearwardly extending collar bearing upon the stem, said collar being tapered rearwardly at an angle of less than 45° to the axis of the stem, and the bore of said sleeve having a forward taper corresponding to and engaging the taper of said collar, and means for forcing said flanged sleeve forward.

7. A valve unit as defined in claim 6, wherein the means for forcing the flanged sleeve forward comprises a helical spring surrounding the sleeve and bearing against the flange at the forward end thereof.

8. A valve unit comprising a stem having a head, a removable gasket surrounding said stem behind said head, a removable sleeve surrounding said stem behind said gasket, said gasket comprising a rearwardly extending flexible collar bearing upon the stem, said collar being tapered rearwardly at an angle of less than 45° to the axis of the stem, the bore of said sleeve having a taper at its forward end engaging the external taper of said collar, and means for forcing the sleeve forward to cause its taper to crowd the tapered collar inwardly and provide a mechanical seal between the collar and the stem.

9. A valve unit comprising a stem having a head, a removable gasket surrounding said stem behind said head, said stem having a large diameter portion behind said gasket, a removable sleeve surrounding said large diameter portion of the stem, said gasket comprising an integral rearwardly extending flexible collar adjacent the stem, said collar being tapered rearwardly, the removable sleeve having a flange at its forward end adapted to engage the gasket forward of said collar, and the bore of said sleeve inwardly of said flange having a forward taper corresponding to the taper of said collar, and means for forcing said sleeve forward to cause it to press upon the principal portion of the gasket and said collar simultaneously, whereby mechanical seals are effected against both the internal and external surfaces of said collar.

References Cited in the file of this patent

UNITED STATES PATENTS

| | | |
|---|---|---|
| 2,291,172 | Scott | July 28, 1942 |
| 2,417,483 | Geiger et al. | Mar. 18, 1947 |
| 2,485,006 | Main et al. | Oct. 18, 1949 |